April 6, 1937.          R. T. FAUNCE          2,076,140
COOKING UTENSIL
Filed Nov. 17, 1936
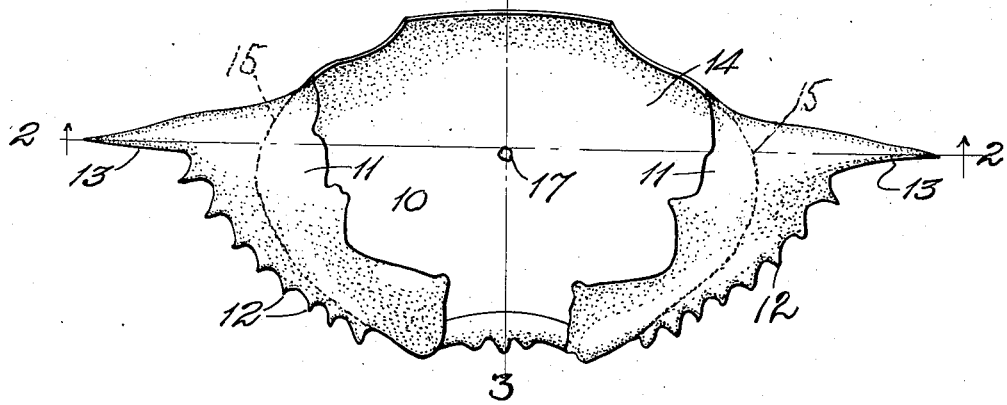
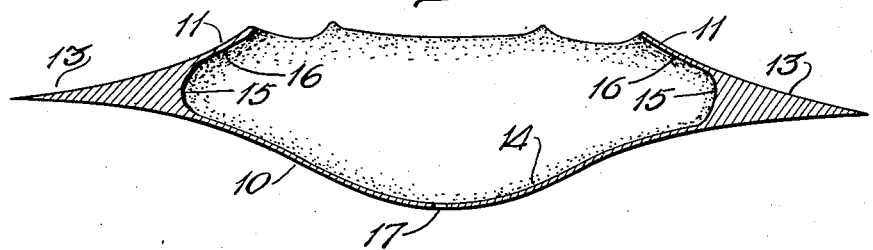
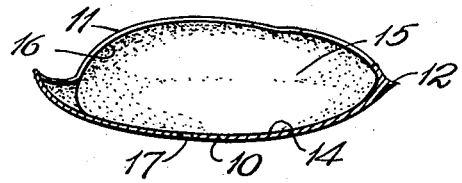
Inventor
Raymond T. Faunce
By Albert Popkins
Attorney

UNITED STATES PATENT OFFICE 2,076,140

COOKING UTENSIL

Raymond T. Faunce, Washington, D. C.

Application November 17, 1936, Serial No. 111,301

4 Claims. (Cl. 53—6)

This invention relates to cooking utensils. In the cooking of many edible substances it is desirable that the food be served in the same utensil in which it is cooked. This is especially true in the preparation and service of certain articles of food such as crab meat in different forms, among which may be mentioned devilled crabs. Devilled crabs are commonly cooked and served in the top shells of crabs. It requires much time to clean crab shells properly to enable food to be cooked in them and it is extremely difficult to clean certain parts of the interior of the shells and particularly the hollow spines projecting from the anterior and lateral portions of the shells. Another objection to the use of such crab shells is that they vary greatly in size and shape so that it is impracticable to serve portions of equal size in these variable sized shells. Further, after such shells have been once used, they cannot well be re-used partly because of sanitary reasons and partly because they are fragile and are frequently broken, either accidentally or purposely to get at the food in the peripheral portions of the shells.

One important object of the present invention is to provide an artificial crab shell of heat resisting material and which is so constructed and arranged that they can be thoroughly cleaned in a perfectly sanitary manner.

A second important object of the invention is to provide an artificial shell of this character wherein all parts of the interior of the shell are formed with smooth curves merging into each other without the formation of angles and corners.

A third important object of the invention is to provide a novel device of this kind so arranged that the food held therein may all be removed by the user without difficulty.

A fourth important object of the invention is to provide a novel device of this kind which may be manufactured in uniform sizes so that food portions served in such shells will be uniform in quantity.

A fifth important object of the invention is to provide a novel device of this kind, wherein means is provided for the escape of grease and the like from the food.

A sixth important object of the invention is to provide a shell of this kind colored with heat resisting colors or pigments so as to exactly simulate or imitate the color of a cooked crab.

With the above and other objects in view, the invention consists in general of certain novel details of construction and combinations of parts hereinafter fully described, illustrated in the accompanying drawing and pointed out in the appended claims.

In the accompanying drawing, like characters of reference indicate like parts in the several views, and Fig. 1 is a top plan view of the invention showing the utensil in the form of a hollow crab shell viewed from the under side of the crab.

Fig. 2 is a section on the line 2—2 of Fig. 1.

Fig. 3 is a section on the line 3—3 of Fig. 1.

In the embodiment of the invention here shown, the utensil is shown as having a main or body portion 10, having overhanging lateral walls 11. The anterior edge of the body is provided with the usual spaced spines 12 common in crabs and also with the usual large lateral spines 13. The utensil is made from any suitable material such as metal, heat resisting glass, or porcelain and it is colored to represent either the natural colors of the live crab or the colors caused by cooking. Obviously, since different species of crabs have different coloration and react differently when heated in cooking, a wide variety of appropriate colors may be used. In any case, the colors, whether formed by coloring the mass of material from which the utensil is made, or by applying to the surface, will be of heat resisting material remaining constant at all temperatures up to cooking temperatures such as 550° F.

The hollow utensil thus formed, has a smoothly curved interior bottom portion 14 merging at its periphery into concave wall portions 15 which merge at their upper parts into the smoothly rounded interior surfaces 16 of the overhanging walls 11.

By means of this construction the entire interior surface is smoothly and unbrokenly curved so as to present no sharp angles or corners and the interior can thus be readily cleaned and rendered perfectly sanitary. Also no difficulty is experienced by the user in removing the food from any part of the utensil. An opening 17 is provided in the bottom for the escape of grease.

In using the utensil, properly prepared food, either raw or partly cooked, is packed in the utensil and the latter is then placed in a cooking oven or other suitable cooking means and cooked. When the cooking is completed the utensil with the food in it is removed and placed on a service plate and served.

While the device has especial utility for cooking and serving crab meat foods and other sea foods, it is obvious that many other foods such as Hamburger steaks, cod fish cakes and others may be cooked and served in this utensil.

It is obvious that changes may be made in the form and construction here shown without departing from the material principles of the invention. It is not therefore desired to confine the invention to the exact form herein shown and described but it is desired to include all such as come within the scope of the appended claims.

There has thus been provided a simple and efficient device of the kind described and for the purpose specified.

What is claimed, is:

1. In a utensil for the purpose described, a body portion having a bottom wall smoothly rounded on its interior surface, peripheral walls having smoothly rounded interior surfaces merging smoothly into the interior surface of the bottom, and overhanging walls provided with smoothly rounded under surfaces merging smoothly into the upper portions of the interior surfaces of the peripheral walls, said utensil being formed of heat resisting material.

2. In a utensil for the purpose described, a body portion having a bottom wall smoothly rounded on its interior surface, peripheral walls having smoothly rounded interior surfaces merging smoothly into the interior surface of the bottom, and overhanging walls provided with smoothly rounded under surfaces merging smoothly into the upper portions of the interior surfaces of the peripheral walls, said utensil being formed of heat resisting material, said bottom wall having a grease escape opening in its lower part.

3. In a utensil for the purpose described, a body portion having a bottom wall smoothly rounded on its interior surface, peripheral walls having smoothly rounded interior surfaces merging smoothly into the interior surface of the bottom, and overhanging walls provided with smoothly rounded under surfaces merging smoothly into the upper portions of the interior surfaces of the peripheral walls, said utensil being formed of heat resisting material and colored with coloring means of heat resisting character to imitate a cooked crab.

4. In a cooking utensil for the purpose described, a body portion having a bottom wall smoothly rounded on its interior surface, peripheral walls having smoothly rounded interior surfaces merging smoothly into the interior surface of the bottom, and overhanging walls provided with smoothly rounded under surfaces merging smoothly into the upper portions of the interior surfaces of the peripheral walls, said utensil being formed of heat resisting material, said bottom wall having a grease escape opening in its lower part and colored with coloring means of heat resisting character to imitate a cooked crab.

RAYMOND T. FAUNCE.